United States Patent
Huang et al.

(10) Patent No.: US 10,602,177 B1
(45) Date of Patent: Mar. 24, 2020

(54) FRAME RATE UP-CONVERSION APPARATUS AND OPERATION METHOD THEREOF

(71) Applicant: Novatek Microelectronics Corp., Hsinchu (TW)

(72) Inventors: Yi-Hung Huang, Hsinchu County (TW); Hsiao-En Chang, Hsinchu County (TW); Jia-Lin Liao, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 8 days.

(21) Appl. No.: 16/147,888

(22) Filed: Oct. 1, 2018

(51) Int. Cl.
*H04N 19/513* (2014.01)
*H04N 19/182* (2014.01)
*H04N 19/176* (2014.01)

(52) U.S. Cl.
CPC ......... *H04N 19/513* (2014.11); *H04N 19/176* (2014.11); *H04N 19/182* (2014.11)

(58) Field of Classification Search
CPC ... H04N 19/513; H04N 19/182; H04N 19/176
See application file for complete search history.

(56) References Cited

U.S. PATENT DOCUMENTS

| | | | | |
|---|---|---|---|---|
| 9,900,550 B1* | 2/2018 | Chou | ...................... | H04N 7/014 |
| 2011/0129015 A1* | 6/2011 | Nguyen | ................. | H04N 19/51 |
| | | | | 375/240.16 |
| 2013/0028530 A1* | 1/2013 | Drugeon | .............. | H04N 19/136 |
| | | | | 382/233 |
| 2018/0220155 A1* | 8/2018 | Drugeon | ................ | H04N 19/42 |

* cited by examiner

*Primary Examiner* — Farzana Hossain
(74) *Attorney, Agent, or Firm* — JCIPRNET

(57) ABSTRACT

A frame rate up-conversion (FRC) apparatus and an operation method thereof are provided. A motion vector (MV) generation circuit provides an MV of a current pixel of an interpolation frame. According to the MV, a data fetch circuit fetches first original data of a first pixel in a first original frame and second original data of a second pixel in a second original frame. According to a position of the first pixel in the first original frame and a position of the second pixel in the second original frame, a boundary processing circuit processes the first original data and the second original data to generate first processed data and second processed data. An interpolation frame generating circuit generates pixel data of the current pixel of the interpolation frame according to the first processed data and the second processed data.

14 Claims, 4 Drawing Sheets

FRAME RATE UP-CONVERSION APPARATUS AND OPERATION METHOD THEREOF

BACKGROUND

Field of the Invention

The invention relates to a display apparatus and more particularly to a frame rate up-conversion (FRC) apparatus and an operating method thereof.

Description of Related Art

A frame rate up-conversion (FRC) operation can increase a display frequency of an image, for example, from 30 frames/second to 60 frames/second. In the FRC operation, an interpolation frame (or more interpolation frames) may be interpolated between a first original frame and a second original frame. In the FRC operation, a motion estimation (ME) operation is performed. Generally, an image frame may be divided into a plurality of blocks. The ME operation is a process for searching a motion vector (MV) of a block. The MV may indicate a motion direction and a motion distance of a certain block. In the FRC operation, the ME operation is performed to calculate an MV between the first original frame and the second original frame. Generally, a 3-dimension recursive search (3DRS) algorithm or other ME algorithms may be performed to calculate the MVs in the FRC operation. After the ME operation is completed, a frame interpolation operation may be performed according to the MVs in the FRC operation, so as to create the interpolation frame (or more interpolation frames) between the first original frame and the second original frame.

FIG. 1 is a schematic diagram of an FRC operation. The horizontal axis of FIG. 1 may represent the time or a display sequence. In the FRC operation, an ME operation is performed to calculate an MV between a first original frame F1 and a second original frame F2. Generally, for any block in the first original frame F1, a similar block (a pairing block) may be found in the second original frame F2. For instance, for a block B11 of the first original frame F1, a pairing block B21 may be found in the second original frame F2, and an MV MV1 may indicate a moving status from the block B11 to the pairing block B21. After the ME operation is completed, an interpolation operation may be performed according to the MV MV1, the block B11 and the pairing block B21 in the FRC operation, so as to obtain an interpolated block Bi1 in an interpolation frame Fint. In the same way, the frame interpolation operation may be performed according to the MVs of different blocks in the FRC operation, so as to create the interpolation frame Fint between the first original frame F1 and the second original frame F2.

In some application scenarios, an aspect ratio of a display panel may be different from that of an image. In such circumstance, a black rim may be added next to the image by the display apparatus, such that the aspect ratio of the frame can match that of the display panel. For instance, a black rim RIM1 may be provided next to an image IMG1 in the first original frame F1, and a black rim RIM2 may be provided next to an image IMG2 in the second original frame F2. The color of the "black rims" as referred to herein is not necessarily black. Based on design requirements, the color of the black rims may be black, blue or other colors. When a certain object leaves from an image (or the object enters the image), a pairing block corresponding to the block may fall in the black rim. For instance, an MV MV2 may be calculated for a block B12 of the first original frame F1 in the ME operation, and a pairing block B22 corresponding to the block B12 has left from the image IMG2 in the second original frame F2 and fallen within the black rim RIM2 of the second original frame F2. Apparently, because a content of the pairing block B22 is the content related to the black rim, an interpolated block Bi2 which is interpolated according to the block B12 and the pairing block B22 in the FRC operation may have an incorrect content. The incorrect interpolated block Bi2 causes a defect of halo to appear in the interpolation frame Fint.

In some conventional display apparatuses, the black rim added next to the image may be a gradient black rim (which is not a black rim in a single color and/or in a single gray level). For the gradient black rim, a conventional FRC apparatus cannot accurately determine a boundary of the black rim, such that noise of the black rims may be infiltrated into the image of the interpolation frame Fint.

SUMMARY

The invention provides a frame rate up-conversion (FRC) apparatus and an operation method thereof capable of generating an interpolation frame.

According to an embodiment of the invention, a FRC apparatus is provided. The FRC apparatus includes a motion vector (MV) generation circuit, a data fetch circuit, a boundary processing circuit and an interpolation frame generating circuit. The MV generation circuit is configured to compare a first original frame with a second original frame to obtain an MV of a current pixel of an interpolation frame between the first original frame and the second original frame. The data fetch circuit is coupled to the MV generation circuit to receive the MV. The data fetch circuit fetches first original data of a first pixel in the first original frame which is pointed to by the MV. The data fetch circuit fetches second original data of a second pixel in the second original frame which is pointed to by the MV. The boundary processing circuit is coupled to the data fetch circuit to receive the first original data and the second original data. The boundary processing circuit checks a first boundary distance from the first pixel to a boundary of an image in the first original frame. The boundary processing circuit checks a second boundary distance from the second pixel to a boundary of an image in the second original frame. The boundary processing circuit processes the first original data and the second original data according to the first boundary distance and the second boundary distance to generate first processed data of the first pixel and second processed data of the second pixel. The interpolation frame generating circuit is coupled to the boundary processing circuit to receive the first processed data and the second processed data. The interpolation frame generating circuit generates pixel data of the current pixel of the interpolation frame according to the first processed data and the second processed data.

According to an embodiment of the invention, an operation method of a FRC apparatus is provided. The operation method includes: comparing a first original frame with a second original frame to obtain an MV of a current pixel of an interpolation frame between the first original frame and the second original frame by a MV generation circuit; fetching first original data of a first pixel in the first original frame which is pointed to by the MV by a data fetch circuit; fetching second original data of a second pixel in the second original frame which is pointed to by the MV by the data fetch circuit; checking a first boundary distance from the first pixel to a boundary of an image in the first original frame by a boundary processing circuit; checking a second boundary distance from the second pixel to a boundary of an image in the second original frame by the boundary processing circuit; processing the first original data and the second original data according to the first boundary distance and the second boundary distance to generate first processed data of the first pixel and second processed data of the second pixel by the boundary processing circuit; and generating pixel data of the current pixel of the interpolation frame according to the first processed data and the second processed data by an interpolation frame generating circuit.

To sum up, in the FRC apparatus and the operation method thereof provided by the embodiments of the invention, the first original data of the first pixel in the first original frame and the second original data of the second pixel in the second original frame can be fetched according to the MV. According to the first boundary distance from the first pixel to the boundary of the image in the first original frame and the second boundary distance from the second pixel to the boundary of the image in the second original frame, the boundary processing circuit can process the first original data and the second original data to generate the first processed data of the first pixel and the second processed data of the second pixel. The interpolation frame generating circuit can generate the pixel data of the current pixel of the interpolation frame according to the first processed data and the second processed data. Thus, the FRC apparatus can generate the interpolation frame and prevent the noise of the black rims from being infiltrated into the image of the interpolation frame.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
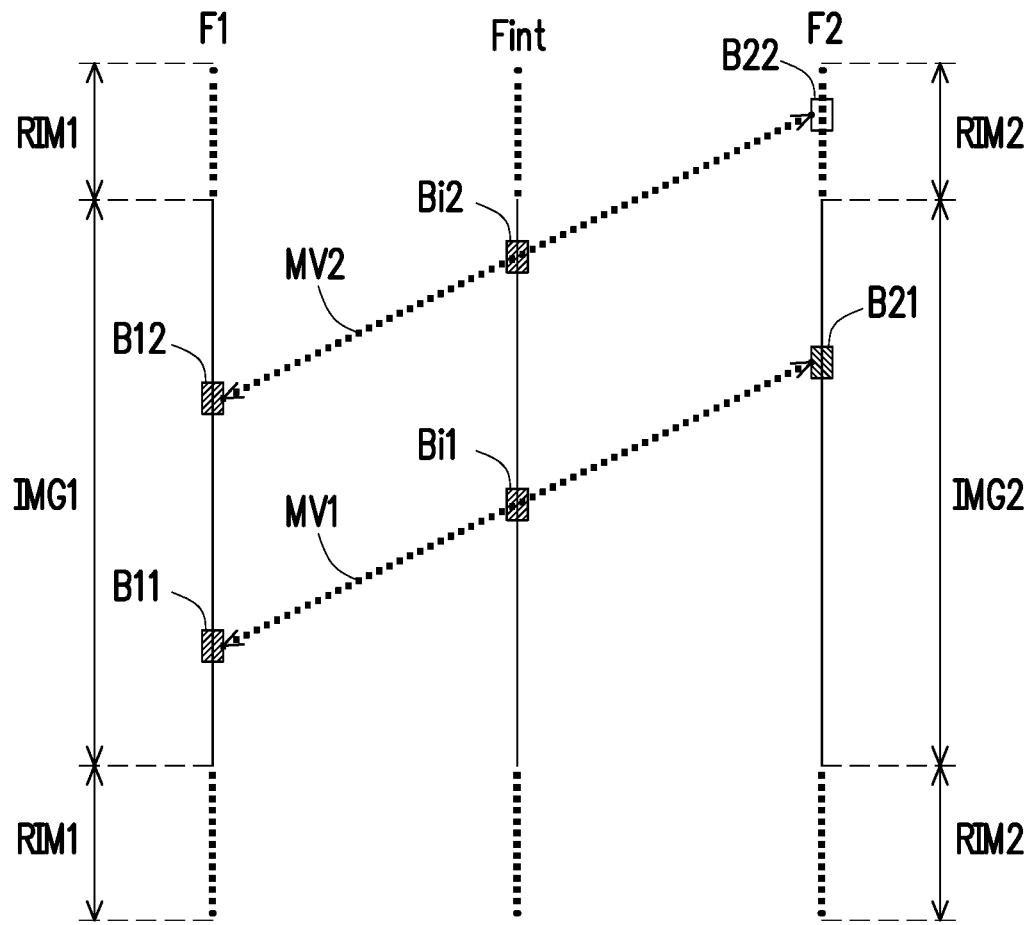
FIG. 1 is a schematic diagram of a frame rate up-conversion (FRC) operation.

The term "couple (or connect)" herein (including the claims) are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Moreover, elements/components/steps with same reference numerals represent same or similar parts in the drawings and embodiments. Elements/components/notations with the same reference numerals in different embodiments may be referenced to the related description.

Figure 2:
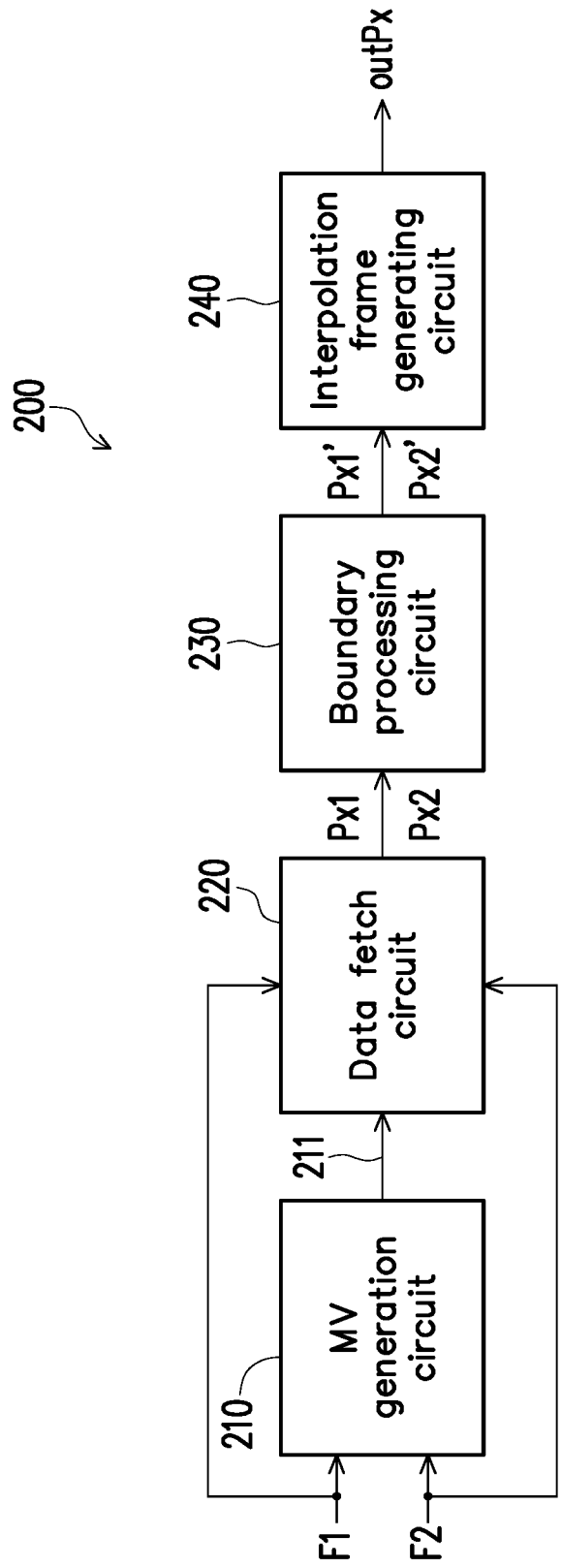
FIG. 2 is a schematic circuit block diagram of a frame rate up-conversion (FRC) apparatus according to an embodiment of the invention.

FIG. 2 is a schematic circuit block diagram of a frame rate up-conversion (FRC) apparatus 200 according to an embodiment of the invention. The FRC apparatus 200 includes a motion vector (MV) generation circuit 210, a data fetch circuit 220, a boundary processing circuit 230 and an interpolation frame generating circuit 240. The MV generation circuit 210 may compare a first original frame F1 with a second original frame F2 to obtain a motion vector (MV) 211 of each block of an interpolation frame Fint between the first original frame F1 and the second original frame F2. For instance, referring to FIG. 1, the MV generation circuit 210 may perform a motion estimation (ME) operation to obtain similar blocks (pairing blocks) B11 and B21 in the first original frame F1 and the second original frame F2 and calculate an MV MV1 of a current block (i.e., an interpolated block Bi1) of the interpolation frame Fint. In other words, the MV generation circuit 210 may compare the first original frame with the second original frame to obtain an MV of a current pixel of the interpolation frame Fint between the first original frame F1 and the second original frame F2. An ME algorithm used by the MV generation circuit 210 is not limited in the present embodiment. For instance, the MV generation circuit 210 may perform a conventional ME algorithm or any other algorithm, so as to obtain the MV 211 of each pixel of the interpolation frame Fint.

Figure 3:
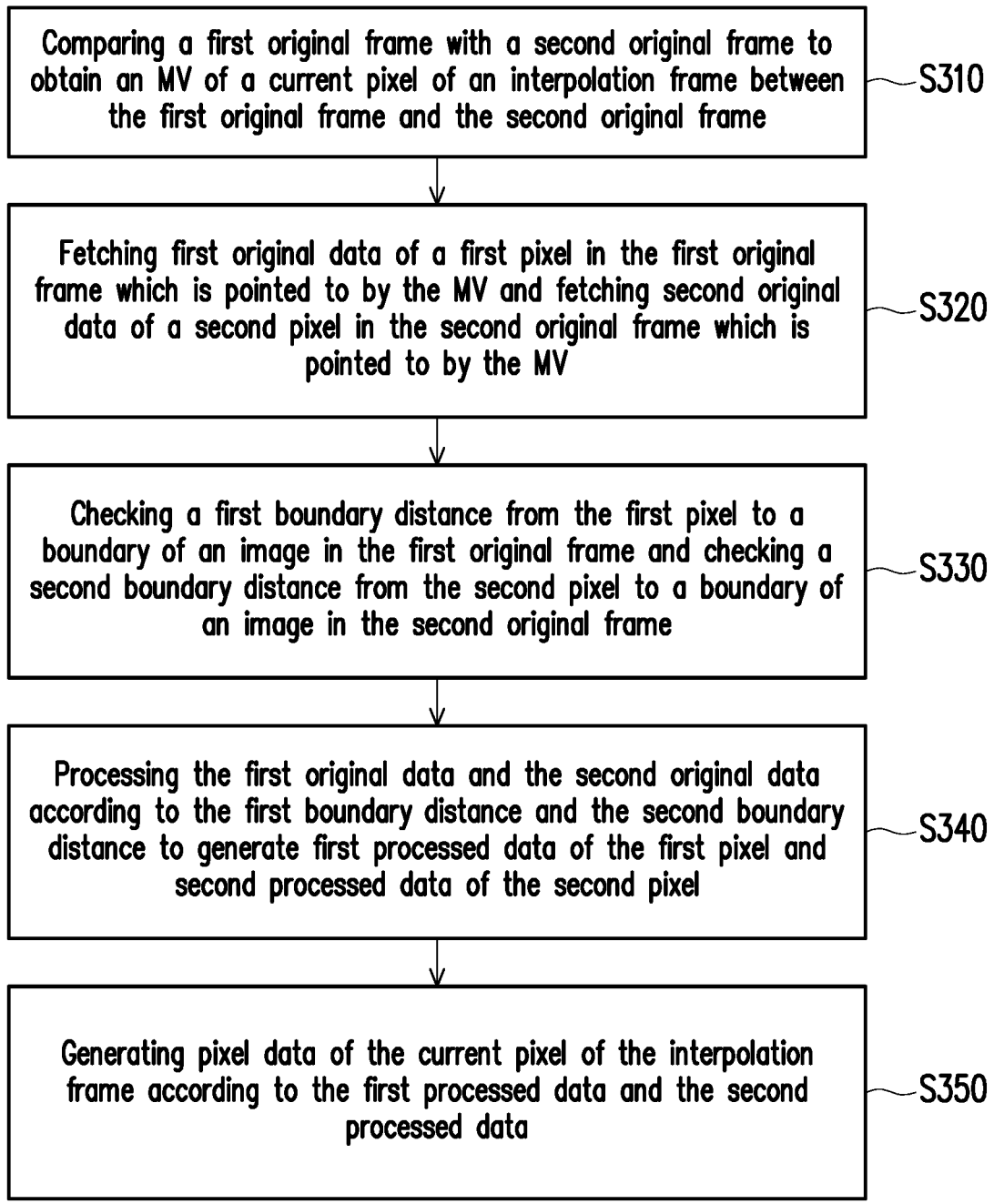
FIG. 3 is a flowchart illustrating an operation method of an FRC apparatus according to an embodiment of the invention.

FIG. 3 is a flowchart illustrating an operation method of an FRC apparatus according to an embodiment of the invention. Referring to FIG. 2 and FIG. 3, in step S310, the MV generation circuit 210 compares the first original frame F1 with the second original frame F2 to obtain an MV 211 of the current pixel of the interpolation frame Fint between the first original frame F1 and the second original frame F2.

The data fetch circuit 220 is coupled to the MV generation circuit 210 to receive the MV 211. In step S320, the data fetch circuit 220 may fetch first original data Px1 of a first pixel in the first original frame F1 which is pointed to by the MV 211. The data fetch circuit 220, in step S320, may also fetch second original data Px2 of a second pixel in the second original frame F2 which is pointed to by the MV 211.

The boundary processing circuit 230 is coupled to the data fetch circuit 220 to receive the first original data Px1 and the second original data Px2. The boundary processing circuit 230 may detect/obtain a border position between an image IMG1 and a black rim RIM1 in the first original frame F1 (which is a position of a boundary of the image IMG1 in the first original frame F1) and detect/obtain a border position between an image IMG2 and a black rim RIM2 in the second original frame F2 (which is a position of a boundary of the image IMG of the second original frame F1). An algorithm for the boundary processing circuit 230 to detect/obtain the border positions between the images and the black rims is not limited in the present embodiment. For instance, the boundary processing circuit 230 may perform a conventional algorithm or any other algorithm to detect/obtain the border positions between the images and the black rims.

In step S330, the boundary processing circuit 230 may check a first boundary distance from the first pixel to the boundary of the image IMG1 in the first original frame F1. The boundary processing circuit 230, in step S330, may also check a second boundary distance from the second pixel to a boundary of the image IMG2 in the second original frame F2. In step S340, the boundary processing circuit 230 may process the first original data Px1 and the second original data Px2 according to the first boundary distance and the second boundary distance to generate first processed data Px1' of the first pixel and second processed data Px2' of the second pixel.

The interpolation frame generating circuit 240 is coupled to the boundary processing circuit 230 to receive the first processed data Px1' and the second processed data Px2'. In step S350, the interpolation frame generating circuit 240 may generate pixel data outPx of a current pixel of the interpolation frame Fint according to the first processed data Px1' and the second processed data Px2'. In other words, according to the processed data of different pixels in the first original frame F1 and the processed data of different pixels in the second original frame F2, the interpolation frame generating circuit 240 may perform a motion compensation (MC) algorithm to generate pixel data of different pixels of the interpolation frame Fint, but the MC algorithm used by the interpolation frame generating circuit 240 is not limited in the present embodiment. For instance, the MV generation circuit 210 may perform a conventional MC algorithm or any other algorithm, so as to create the interpolation frame Fint (or more) between the first original frame F1 and the second original frame F2.

The FRC apparatus 200 of the present embodiment may fetch the first original data Px1 of the first pixel in the first original frame F1 and the second original data Px2 of the second pixel in the second original frame F2 according to the MV 211. According to the first boundary distance from the first pixel to the boundary of the image IMG1 in the first original frame F1 and the second boundary distance from the second pixel to the boundary of the image IMG2 in the second original frame F2, the boundary processing circuit 230 may process the first original data Px1 and the second original data Px2 to generate the first processed data Px1' of the first pixel and the second processed data Px2' of the second pixel. The interpolation frame generating circuit 240 may generate the pixel data outPx of the current pixel of the interpolation frame Fint according to the first processed data Px1' and the second processed data Px2'. Because the boundary processing circuit 230 may process the first original data Px1 and the second original data Px2 based on the distances from the pixels to the black rims, the interpolation frame Fint generated by the interpolation frame generating circuit 240 may prevent noise of the black rims from being infiltrated into the images.

Figure 4:
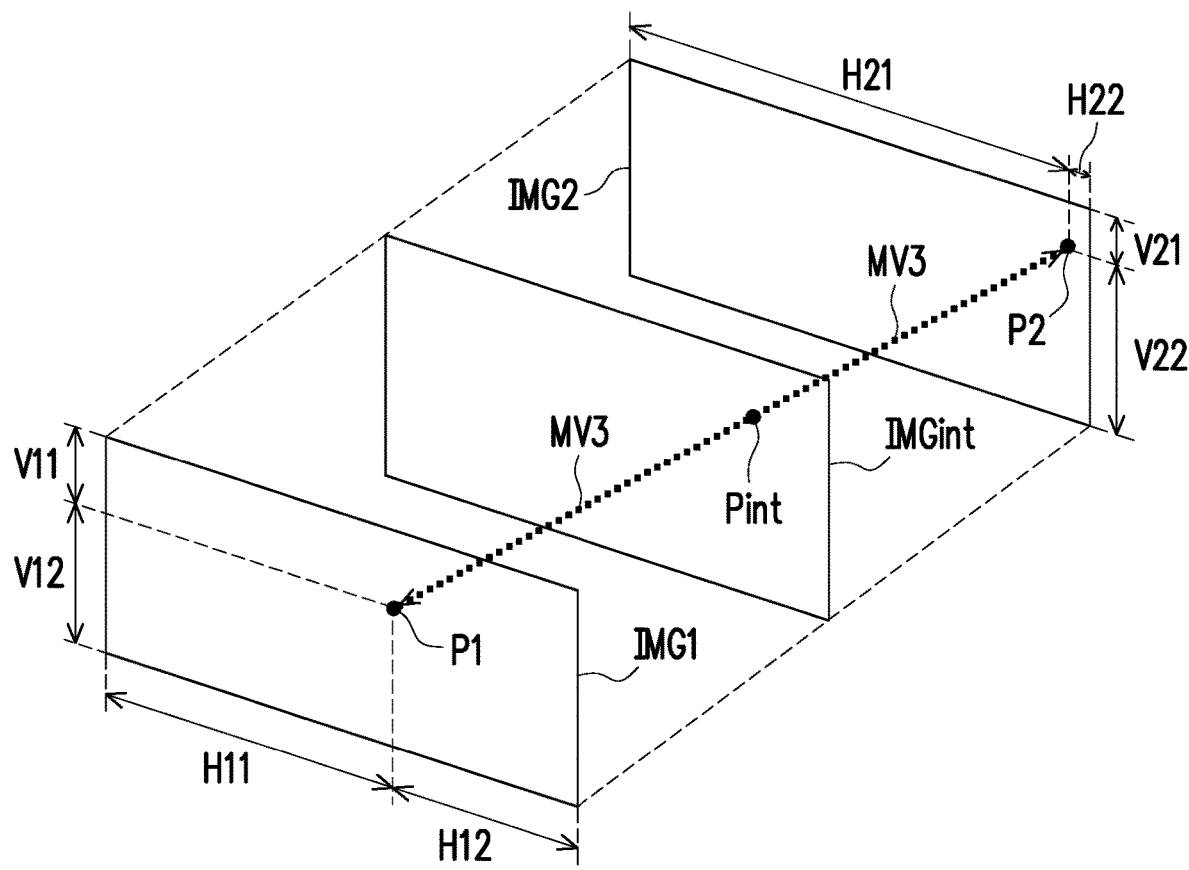
FIG. 4 is a schematic motion diagram of pixels in different frames according to an embodiment of the invention.

FIG. 4 is a schematic motion diagram of pixels in different frames according to an embodiment of the invention. In FIG. 4, IMG1 represents an image in the first original frame F1, IMGint represents an image in the interpolation frame Fint, and IMG2 represents an image in the second original frame F2. A first pixel P1 is located in the image IMG1 in the first original frame F1, a first pixel P1 is located in the image IMG1 in the first original frame F1. An interpolation pixel (i.e., a current pixel) Pint is located in the image IMGint in the interpolation frame Fint. A second pixel P2 is located in the image IMG2 in the second original frame F2. The MV generation circuit 210 may compare the first original frame F1 with the second original frame F2 to obtain an MV MV3 of the current pixel Pint of the interpolation frame Fint. The data fetch circuit 220 may fetch the first original data Px1 of the first pixel P1 in the first original frame F1 which is pointed to by the MV MV3. The data fetch circuit 220 may also fetch the second original data Px2 of the second pixel P2 in the second original frame F2 which is pointed to by the MV MV3.

The boundary processing circuit 230 may detect/obtain a position of a boundary of the image IMG1 in the first original frame F1 and detect/obtain a position of a boundary of the image IMG2 in the second original frame F2. The boundary processing circuit 230 may calculate distances from the first pixel P1 to four boundaries of the image IMG1 in the first original frame F1, which are distances H11, H12, V11 and V12, respectively. The boundary processing circuit 230 may serve the minimum of the distances H11, H12, V11 and V12 as the first boundary distance. In the same way, the boundary processing circuit 230 may further calculate distances from the second pixel P2 to four boundaries of the image IMG2 in the second original frame F2, which are distances H21, H22, V21 and V22, respectively. The boundary processing circuit 230 may serve the minimum of the distances H21, H22, V21 and V22 as the second boundary distance.

The boundary processing circuit 230 may determine a reliability value of the first original data Px1 of the first pixel P1 according to the first boundary distance of the first pixel P1. The boundary processing circuit 230 may process the first original data Px1 according to the reliability value of the the first original data Px1 to generate the first processed data Px1' of the first pixel P1. The boundary processing circuit 230 may further determine a reliability value of the second original data Px2 of the second pixel P2 according to the second boundary distance of the second pixel P2. The boundary processing circuit 230 may process the second original data Px2 according to the reliability value of the the second original data Px2 to generate the second processed data Px2' of the second pixel P2.

Figure 5:
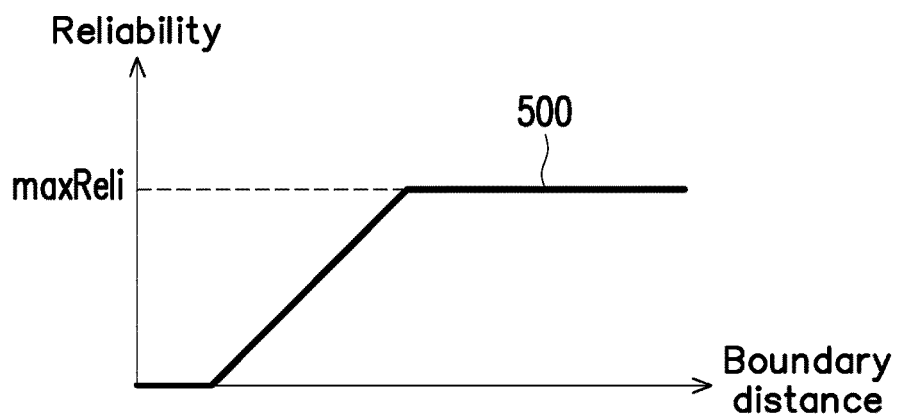
FIG. 5 is a schematic diagram of a reliability curve according to an embodiment of the invention.

FIG. 5 is a schematic diagram of a reliability curve according to an embodiment of the invention. In FIG. 5, the horizontal axis represents the boundary distance, and the vertical axis represents the reliability. In some embodiments, the boundary processing circuit 230 may convert the first boundary distance of the first pixel P into a reliability value of the first original data Px1 by using a reliability curve 500 illustrated in FIG. 5. The boundary processing circuit 230 may also convert the second boundary distance of the second pixel P2 into a reliability value of the second original data Px2 by using the reliability curve 500. According to the reliability curve 500, as a pixel is closer to an image boundary, original data of the pixel has a lower reliability value. It should be noted that the reliability curve 500 may be determined based on a design requirement. For instance, the reliability curve 500 may depend on characteristics of the black rims next to the images.

In some other embodiments, the conversion relationship between the boundary distances and the reliability values may also be stored in a look-up table. The boundary processing circuit 230 may convert the first boundary distance into the reliability value of the first original data Px1 by using the look-up table. The boundary processing circuit 230 may also convert the second boundary distance into the reliability value of the second original data Px2 by using the look-up table. It should be noted that the look-up table may be determined based on a design requirement. For instance, the contents of the look-up table may depend on the characteristics of the black rims next to the images.

The boundary processing circuit 230 may calculate the first processed data Px1' of the first pixel P1 by using the reliability value of the first original data Px1, the first original data Px1 and the second original data Px2. The boundary processing circuit 230 may further calculate the second processed data Px2' of the second pixel P2 by using the reliability value of the second original data Px2, the first original data Px1 and the second original data Px2. For example (but not limited to), it is assumed that the reliability value of the first original data Px1 is Reli1, the reliability value of the second original data Px2 is Reli2, a reliability range including the reliability value Reli1 and the reliability value Reli2 is maxReli, and the boundary processing circuit 230 may calculate Equation 1 below, so as to generate the first processed data Px1' of the first pixel P1. The boundary processing circuit 230 may further calculate Equation 2 below, so as to generate the second processed data Px2' of the second pixel P2.

$$Px1'=[Reli1*Px1+(maxReli-Reli1)*Px2]/maxReli \quad \text{Equation 1}$$

$$Px2'=[(maxReli-Reli2)*Px1+Reli2*Px2]/maxReli \quad \text{Equation 2}$$

According to the first processed data Px1' of the first pixel P1 and the second processed data Px2' of the second pixel P2, the interpolation frame generating circuit 240 may generate the pixel data outPx of the current pixel Pint of the interpolation frame Fint. By deducing by analogy, the interpolation frame generating circuit 240 may generate the pixel data of all the pixels of the interpolation frame Fint. Thereby, the interpolation frame generating circuit 240 may generate the interpolation frame Fint.

In a condition that a black rim added next to the image may be a gradient black rim (which is not a black rim in a single color and/or in a single gray level), it is difficult to determine the boundary of the image. A position of an image boundary detected by the boundary processing circuit 230 usually falls within the gradient black rim. Thus, as a pixel is closer to the image boundary, the original data of the pixel is more likely to have the color (or the gray level) of the black rim. According to the reliability curve 500, as a pixel is closer to an image boundary, original data of the pixel has a lower reliability value. Otherwise, as a pixel is farther from an image boundary, original data of the pixel has a higher reliability value. The boundary processing circuit 230 may determine the reliability value of the first original data Px1 and the reliability value of the second original data Px2 based on the distances from the pixels to the black rims (i.e., the distances from the pixels to the image boundaries) and obtain the first processed data Px1' and second processed data Px2' based on the first original data Px1, the second original data Px2 and the reliability values. Namely, the first processed data Px1' and the second processed data Px2' are processing results in which the distances from the pixels to the image boundaries are considered. Therefore, the interpolation frame Fint generated by the interpolation frame generating circuit 240 may prevent the noise of the black rims from being infiltrated into the images.

Based on different design demands, the MV generation circuit 210, the data fetch circuit 220, the boundary processing circuit 230 and/or the interpolation frame generating circuit 240 may be implemented in a form of hardware, firmware, software (i.e., programs) or in a combination of many of the aforementioned three forms.

In terms of the hardware form, the blocks of the MV generation circuit 210, the data fetch circuit 220, the boundary processing circuit 230 and/or the interpolation frame generating circuit 240 may be implemented in a logic circuit on an integrated circuit. Related functions of the MV generation circuit 210, the data fetch circuit 220, the boundary processing circuit 230 and/or the interpolation frame generating circuit 240 may be implemented in the hardware form by utilizing hardware description languages (e.g., Verilog HDL or VHDL) or other suitable programming languages. For instance, the related functions of the MV generation circuit 210, the data fetch circuit 220, the boundary processing circuit 230 and/or the interpolation frame generating circuit 240 may be implemented in one or more controllers, micro-controllers, microprocessors, application-specific integrated circuits (ASICs), digital signal processors (DSPs), field programmable gate arrays (FPGAs) and/or various logic blocks, modules and circuits in other processing units.

In terms of the software form and/or the firmware form, the related functions of the MV generation circuit 210, the data fetch circuit 220, the boundary processing circuit 230 and/or the interpolation frame generating circuit 240 may be implemented as programming codes. For example, the MV generation circuit 210, the data fetch circuit 220, the boundary processing circuit 230 and/or the interpolation frame generating circuit 240 may be implemented by using general programming languages (e.g., C or C++) or other suitable programming languages. The programming codes may be recorded/stored in recording media. The aforementioned recording media include a read only memory (ROM), a storage device and/or a random access memory (RAM). Additionally, the programming codes may be accessed from the recording medium and executed by a computer, a central processing unit (CPU), a controller, a micro-controller or a microprocessor to accomplish the related functions. As for the recording medium, a non-transitory computer readable medium, such as a tape, a disk, a card, a semiconductor memory or a programming logic circuit, may be used. In addition, the programs may be provided to the computer (or the CPU) through any transmission medium (e.g., a communication network or radio waves). The communication network is, for example, the Internet, wired communication, wireless communication or other communication media.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A frame rate up-conversion (FRC) apparatus, comprising:
    a motion vector (MV) generation circuit, configured to compare a first original frame with a second original frame to obtain a motion vector (MV) of a current pixel of an interpolation frame between the first original frame and the second original frame;
    a data fetch circuit, coupled to the MV generation circuit to receive the MV, fetching first original data of a first pixel in the first original frame which is pointed to by the MV, and fetching second original data of a second pixel in the second original frame which is pointed to by the MV;
    a boundary processing circuit, coupled to the data fetch circuit to receive the first original data and the second original data, checking a first boundary distance from the first pixel to a boundary of an image in the first original frame, checking a second boundary distance from the second pixel to a boundary of an image in the second original frame, and processing the first original data and the second original data according to the first boundary distance and the second boundary distance to generate first processed data of the first pixel and second processed data of the second pixel; and
    an interpolation frame generating circuit, coupled to the boundary processing circuit to receive the first processed data and the second processed data, and generating pixel data of the current pixel of the interpolation frame according to the first processed data and the second processed data.

2. The FRC apparatus according to claim 1, wherein the boundary processing circuit calculates a first distance from the first pixel to a first boundary of the image in the first original frame, calculates a second distance from the first pixel to a second boundary of the image in the first original frame, calculates a third distance from the first pixel to a third boundary of the image in the first original frame, calculates a fourth distance from the first pixel to a fourth boundary of the image in the first original frame, and serves the minimum of the first distance, the second distance, the third distance and the fourth distance as the first boundary distance.

3. The FRC apparatus according to claim 1, wherein the boundary processing circuit calculates a first distance from the second pixel to a first boundary of the image in the second original frame, calculates a second distance from the second pixel to a second boundary of the image in the second original frame, calculates a third distance from the second pixel to a third boundary of the image in the second original frame, calculates a fourth distance from the second pixel to a fourth boundary of the image in the second original frame, and serves the minimum of the first distance, the second distance, the third distance and the fourth distance as the second boundary distance.

4. The FRC apparatus according to claim 1, wherein the boundary processing circuit determines a first reliability value of the first original data according to the first boundary distance, processes the first original data according to the first reliability value to generate the first processed data of the first pixel, determines a second reliability value of the second original data according to the second boundary distance, and processes the second original data according to the second reliability value to generate the second processed data of the second pixel.

5. The FRC apparatus according to claim 4, wherein the boundary processing circuit converts the first boundary distance into the first reliability value by using a reliability curve or a look-up table, and converts the second boundary distance into the second reliability value by using the reliability curve or the look-up table.

6. The FRC apparatus according to claim 4, wherein the boundary processing circuit calculates the first processed data of the first pixel by using the first reliability value, the first original data and the second original data, and calculates the second processed data of the second pixel by using the second reliability value, the first original data and the second original data.

7. The FRC apparatus according to claim 6, wherein the first reliability value is Reli1, the second reliability value is Reli2, a reliability range including the first reliability value Reli1 and the second reliability value Reli2 is maxReli, the first original data is Px1, the second original data is Px2, and the boundary processing circuit calculates Px1'= [Reli1*Px1+(maxReli−Reli1)*Px2]/maxReli to generate the first processed data Px1' of the first pixel and calculates Px2'=[(maxReli−Reli2)*Px1+Reli2*Px2]/maxReli to generate the second processed data Px2' of the second pixel.

8. An operation method of a frame rate up-conversion apparatus, comprising:

comparing a first original frame with a second original frame to obtain an motion vector (MV) of a current pixel of an interpolation frame between the first original frame and the second original frame by a MV generation circuit;

fetching, by a data fetch circuit, first original data of a first pixel in the first original frame which is pointed to by the MV;

fetching, by the data fetch circuit, second original data of a second pixel in the second original frame which is pointed to by the MV;

checking a first boundary distance from the first pixel to a boundary of an image in the first original frame by a boundary processing circuit;

checking a second boundary distance from the second pixel to a boundary of an image in the second original frame by the boundary processing circuit;

processing the first original data and the second original data according to the first boundary distance and the second boundary distance to generate first processed data of the first pixel and second processed data of the second pixel by the boundary processing circuit; and generating pixel data of the current pixel of the interpolation frame according to the first processed data and the second processed data by an interpolation frame generating circuit.

9. The operation method according to claim 8, wherein the step of checking the first boundary distance from the first pixel to the boundary of the image in the first original frame comprises:

calculating a first distance from the first pixel to a first boundary of the image in the first original frame;

calculating a second distance from the first pixel to a second boundary of the image in the first original frame;

calculating a third distance from the first pixel to a third boundary of the image in the first original frame;

calculating a fourth distance from the first pixel to a fourth boundary of the image in the first original frame; and serving the minimum of the first distance, the second distance, the third distance and the fourth distance as the first boundary distance.

10. The operation method according to claim 8, wherein the step of checking the second boundary distance from the second pixel to the boundary of the image in the second original frame comprises:

calculating a first distance from the second pixel to a first boundary of the image in the second original frame;

calculating a second distance from the second pixel to a second boundary of the image in the second original frame;

calculating a third distance from the second pixel to a third boundary of the image in the second original frame;

calculating a fourth distance from the second pixel to a fourth boundary of the image in the second original frame; and serving the minimum of the first distance, the second distance, the third distance and the fourth distance as the second boundary distance.

11. The operation method according to claim 8, wherein the step of generating the first processed data of the first pixel and the second processed data of the second pixel comprises:

determining a first reliability value of the first original data according to the first boundary distance;

processing the first original data according to the first reliability value to generate the first processed data of the first pixel;

determining a second reliability value of the second original data according to the second boundary distance; and processing the second original data according to the second reliability value to generate the second processed data of the second pixel.

12. The operation method according to claim 11, wherein
the boundary processing circuit converts the first boundary distance into the first reliability value by using a reliability curve or a look-up table, and
the boundary processing circuit converts the second boundary distance into the second reliability value by using the reliability curve or the look-up table.

13. The operation method according to claim 11, wherein
the boundary processing circuit calculates the first processed data of the first pixel by using the first reliability value, the first original data and the second original data, and
the boundary processing circuit calculates the second processed data of the second pixel by using the second reliability value, the first original data and the second original data.

14. The operation method according to claim 13, wherein the first reliability value is Reli1, the second reliability value is Reli2, a reliability range including the first reliability value Reli1 and the second reliability value Reli2 is maxReli, the first original data is Px1, the second original data is Px2, and the boundary processing circuit calculates Px1'=[Reli1*Px1+(maxReli−Reli1)*Px2]/maxReli to generate the first processed data Px1' of the first pixel and calculates Px2'=[(maxReli−Reli2)*Px1+Reli2*Px2]/maxReli to generate the second processed data Px2' of the second pixel.

* * * * *